(12) United States Patent
Galli

(10) Patent No.: US 12,384,942 B2
(45) Date of Patent: Aug. 12, 2025

(54) LINERLESS SELF-ADHESIVE MATERIAL WITH WASH-OFF PROPERTIES

(71) Applicant: RITRAMA S.P.A, Caponago (IT)

(72) Inventor: Luciano Galli, Novate Milanese (IT)

(73) Assignee: RITRAMA S.P.A, Caponago (IT)

( * ) Notice: Subject to any disclaimer, the term of this patent is extended or adjusted under 35 U.S.C. 154(b) by 220 days.

(21) Appl. No.: 18/260,745

(22) PCT Filed: Dec. 29, 2021

(86) PCT No.: PCT/IB2021/062412
§ 371 (c)(1),
(2) Date: Jul. 7, 2023

(87) PCT Pub. No.: WO2022/149043
PCT Pub. Date: Jul. 14, 2022

(65) Prior Publication Data
US 2024/0052208 A1 Feb. 15, 2024

(30) Foreign Application Priority Data
Jan. 7, 2021 (IT) .................. 102021000000197

(51) Int. Cl.
*C09J 7/38* (2018.01)
*C09J 7/22* (2018.01)

(52) U.S. Cl.
CPC .............. *C09J 7/381* (2018.01); *C09J 7/22* (2018.01); *C09J 2301/124* (2020.08);
(Continued)

(58) Field of Classification Search
CPC ........ C09J 7/381; C09J 7/22; C09J 2301/124; C09J 2301/302; C09J 2301/304;
(Continued)

(56) References Cited

U.S. PATENT DOCUMENTS

2009/0263606 A1* 10/2009 Nonaka .................. B32B 27/34
428/41.3

FOREIGN PATENT DOCUMENTS

JP  2018501357 A * 1/2018 ............. B32B 27/32
WO  2014207693 A1  12/2014
(Continued)

OTHER PUBLICATIONS

Machine translation of JP_2018501357_A. (Year: 2018).*
(Continued)

*Primary Examiner* — Patricia L. Nordmeyer
(74) *Attorney, Agent, or Firm* — CANTOR COLBURN LLP

(57) ABSTRACT

A self-adhesive linerless label for labelling containers, preferably made of PET, the label being particularly adapted to be removed from the container during recycling operations. The label derives from a linerless self-adhesive material that includes a liner made of plastic material having a density greater than 0.8 g/cm$^3$, preferably between 0.9 g/cm$^3$ and 1.5 g/cm$^3$, more preferably between 1 and 1.4 g/cm$^3$ at 25° C. The material is preferably PET or PP, The linerless self-adhesive material also includes a self-adhesive film having a polymeric material with a density of less than 0.9 g/cm$^3$ at 25° C., preferably between 0.6 g/cm$^3$ and 0.9 g/cm$^3$, more preferably between 0.7 and 0.8 g/cm$^3$ at 25° C. The liner and the self-adhesive material are in permanent contact by a thermo-adhesive.

16 Claims, 4 Drawing Sheets

(52) U.S. Cl.
CPC .... *C09J 2301/302* (2020.08); *C09J 2301/304* (2020.08); *C09J 2301/312* (2020.08)

(58) Field of Classification Search
CPC .. C09J 2301/312; C09J 7/38; C09J 2203/334; C09J 2301/1242; C09J 2423/106; B32B 2250/24; B32B 2255/10; B32B 2255/26; B32B 2255/28; B32B 2307/412; B32B 2307/72; B32B 2307/732; B32B 2307/748; B32B 2307/75; B32B 2405/00; B32B 3/266; B32B 7/12; B32B 27/205; B32B 27/32; B32B 27/08; B32B 27/36; B31D 1/021; G09F 3/02; G09F 3/10; G09F 2003/0257
See application file for complete search history.

(56) References Cited

FOREIGN PATENT DOCUMENTS

| WO | 2015118214 A1 | 8/2015 | |
|---|---|---|---|
| WO | WO-2015118210 A1 * | 8/2015 | ............. B32B 27/08 |
| WO | 2017077184 A1 | 5/2017 | |

OTHER PUBLICATIONS

Chilean Office Action for Application No. 202301972, dated Oct. 3, 2024, 15 pages, English translation.
International Search Report for International Application No. PCT/IB2021062413; dated Apr. 19, 2022; 3 pages.
Italian Search Report for Italian Application No. 2021000000197; dated Aug. 24, 2021; 10 pages.
Written Opinion for International Application No. PCT/IB2021062413; dated Apr. 19, 2022; 10 pages.

* cited by examiner

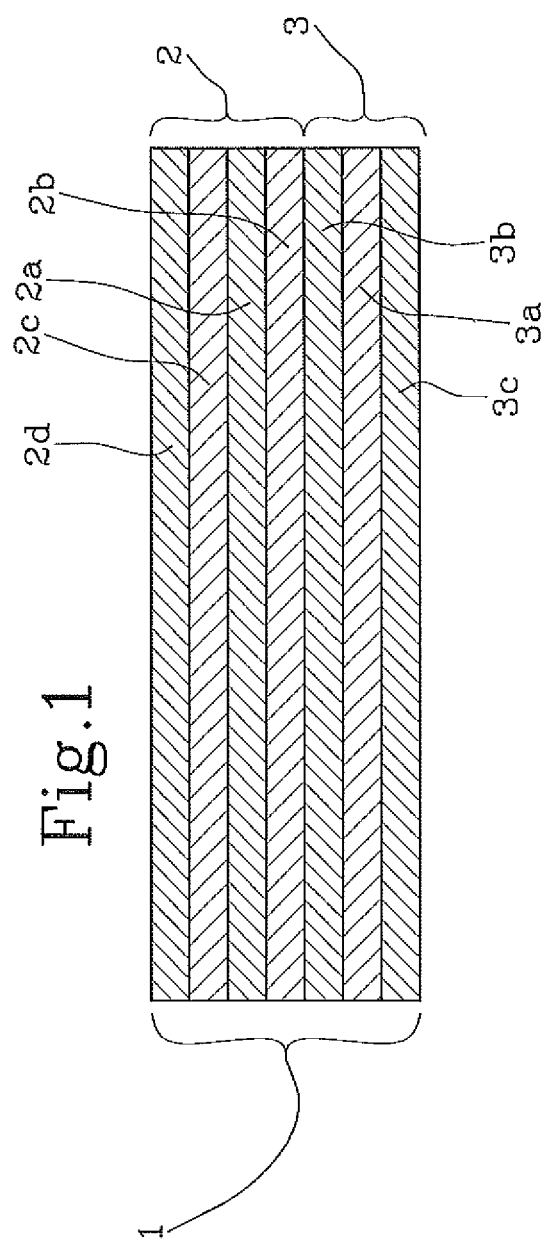
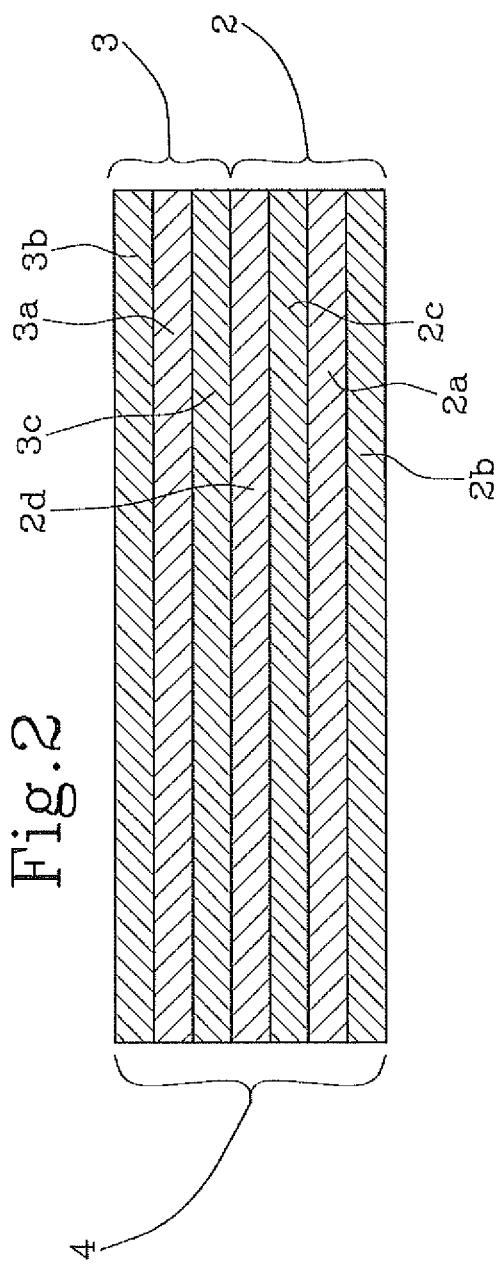

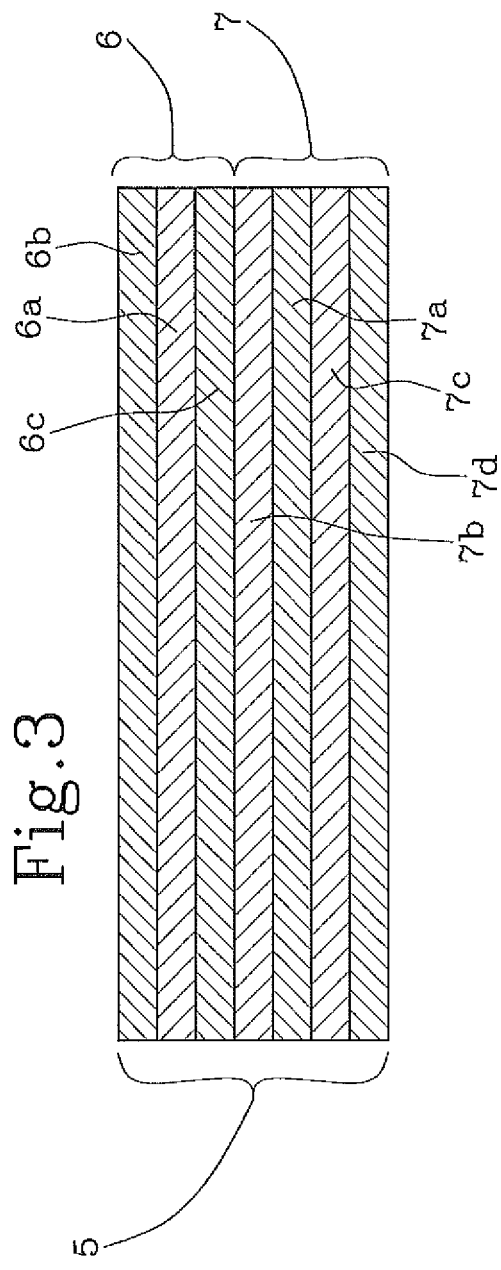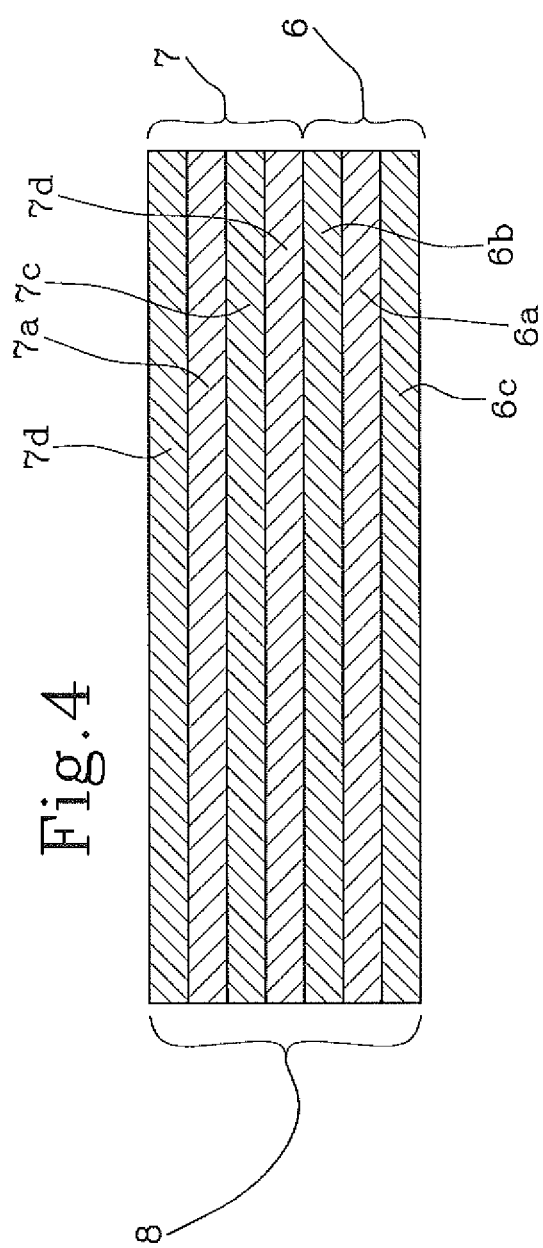

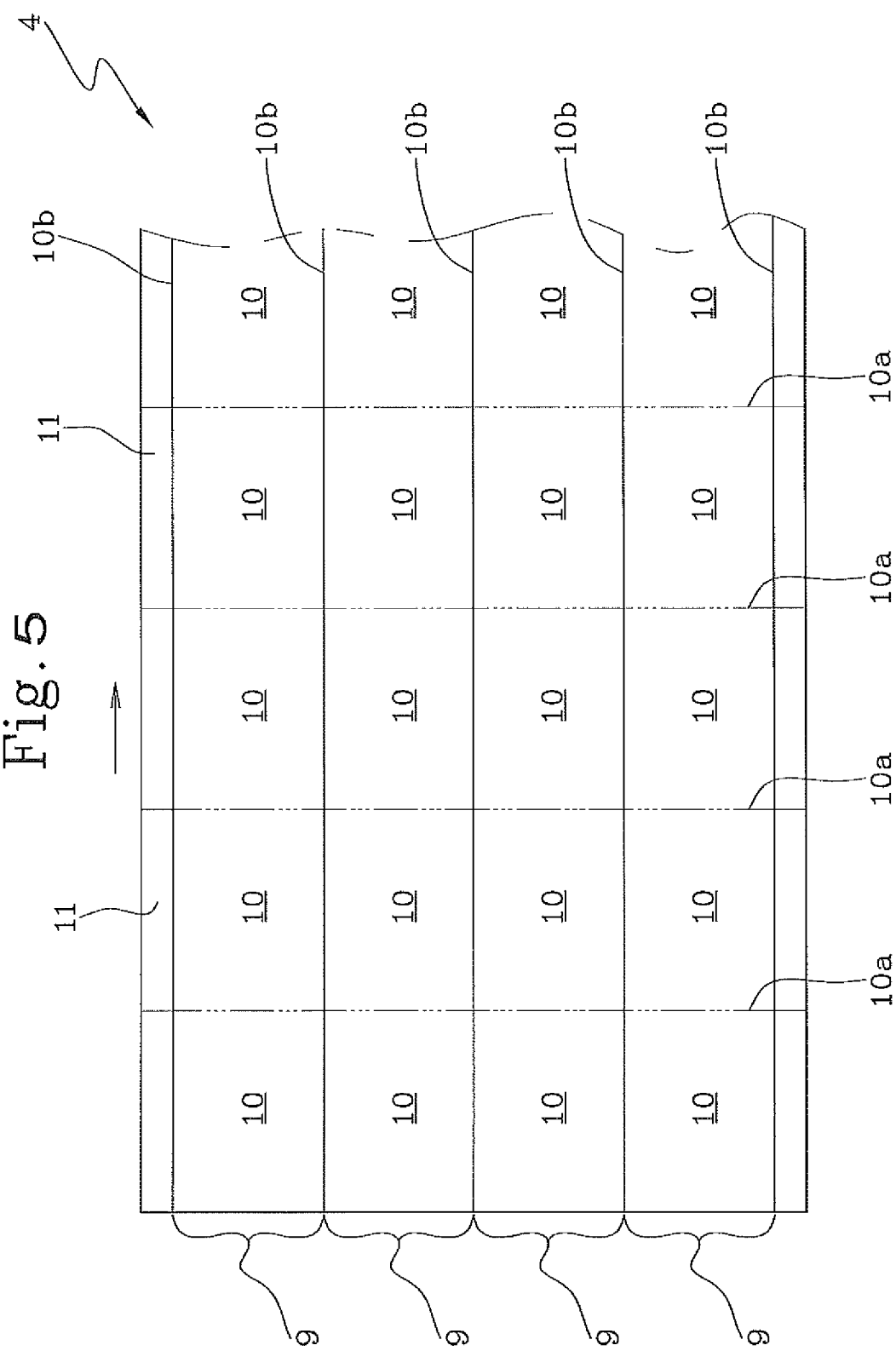

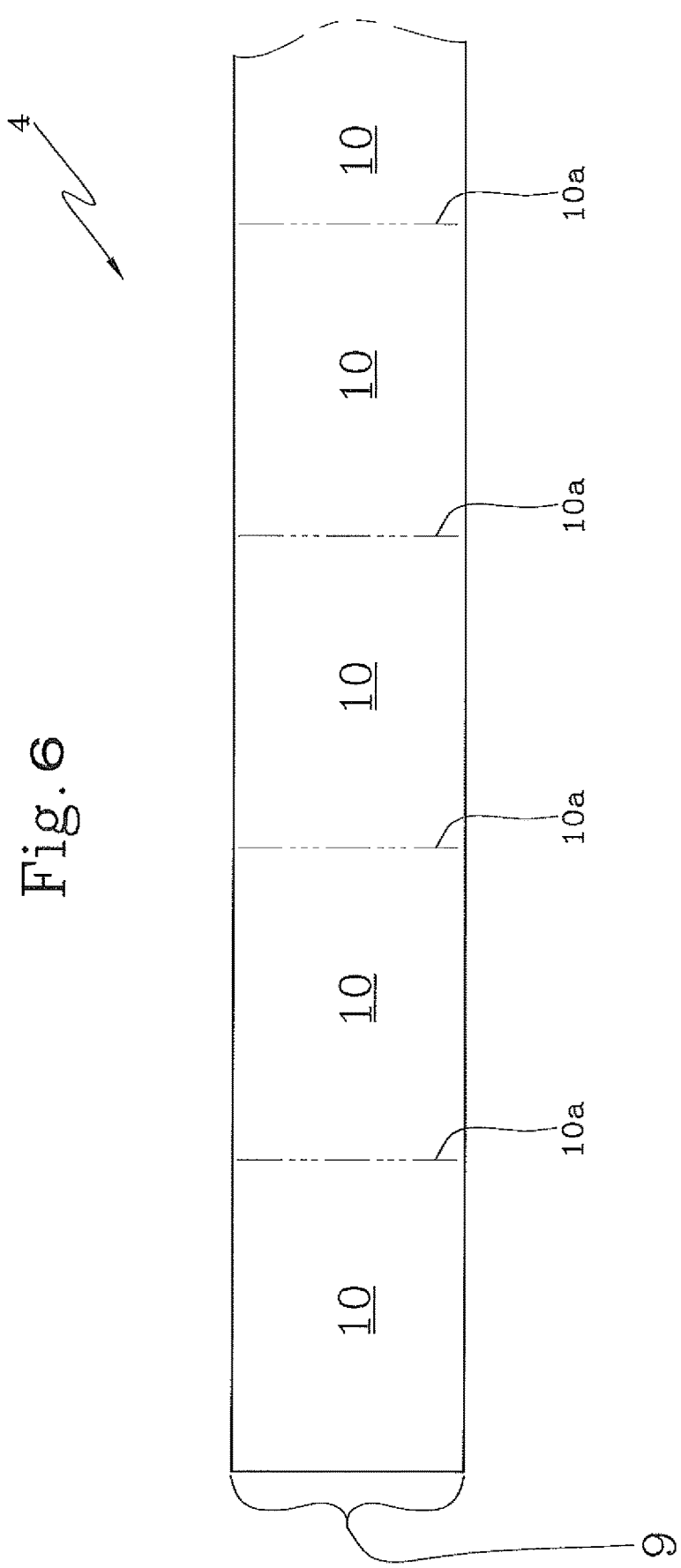

LINERLESS SELF-ADHESIVE MATERIAL WITH WASH-OFF PROPERTIES

FIELD OF THE INVENTION

The present invention relates to a linerless self-adhesive material that may be used for labelling items and is characterised by having a density such as to favour easy recyclability of the labelled item.

PRIOR ART

So-called "linerless" labels are known in the sector of self-adhesive labels. These labels typically have a multi-layered construction comprising a substrate made of a polymeric material (for example polypropylene) coated with a non-stick material ("release coating"), normally silicone, on one side, and with a pressure-sensitive adhesive (PSA) on the opposite side. A printed layer bearing the information one wishes to communicate to the end user, for example a logo, a design, a trademark and/or wording, is normally applied between the substrate and the PSA.

This particular construction of the label does not require the presence of a support layer ("liner" or "backing substrate"), with the undoubted advantage of reducing scrap materials related to the process of labelling an item compared to the use of "conventional" labels which, by contrast, include the presence of a support layer from which the self-adhesive label must be separated before it can be applied onto a surface.

In addition to having the above-mentioned advantage of significantly reducing the amount of scrap material to be disposed of, linerless self-adhesive labels also have several drawbacks, mainly tied to the fact that they require the printer to use a very costly printing machine, whose operation is also complex.

On the other hand, "conventional" self-adhesive labels, that is, labels including a support layer (a "liner" or "backing substrate"), typically have a multi-layered construction in which the substrate made of plastic material on which the printing is carried out is coated with a PSA on the surface opposite the printing surface. In the stage of non-use of the label, the adhesive layer is protected by a liner normally consisting of a layer of plastic, paper, fabric or another material, coated with a non-stick material (e.g. silicone), which is in contact with the PSA on the label. When the label is applied onto a surface, the label is removed from the liner, leaving the adhesive layer free; the adhesive layer will be made to adhere to the application surface by pressing the label onto the surface itself. Once the label has been removed, the liner must be disposed of or, if possible, recycled for other uses. In both cases, the costs connected to a possible disposal or recovery of the liner are clearly evident.

The problem of disposing of the liner was addressed and resolved by patent application WO2014/207693, of the same Applicant, which describes an industrially applicable process for the production of a linerless self-adhesive material obtained starting from a self-adhesive material with a liner; the process makes it possible to resolve the problem of reducing the costs of disposing of the liner, and to overcome the drawbacks of the prior art.

Both the self-adhesive material with a starting liner, and the linerless one obtained with the process of WO2014/207693 have an overall thickness (and thickness of the individual layers) that is smaller than the thicknesses of the known self-adhesive materials. In fact, the known self-adhesive materials with a liner have a front layer of 50 µm to 100 µm, an adhesive layer of about 20 µm and a liner of 23 to 70 µm. The linerless self-adhesive material of WO2014/207693 (both the starting material and the linerless material obtained at the end of the process) comprises, by contrast, thicknesses of the various materials that are decidedly smaller than the known ones. For example, both self-adhesive materials can comprise a 25 µm front layer, an 18 µm adhesive layer and a 12 µm liner.

These reduced thicknesses allow savings in terms of costs because a smaller amount of plastic material and of adhesive can be used, but they also make it possible to give the label deriving from that material an element of sustainability, which is an important value for the marketing of the item labelled with that label. With regard to sustainability, the recyclability of plastic items is a highly topical issue, also due to the growing attention being paid to this issue by consumers. The use of polymeric materials to package products of any kind, for example products such as beverages and food, personal care products such as cleansers, soaps, shampoo, conditioner, creams, fragrances etc., is increasingly widespread owing to the properties of shock resistance, transparency and light weight of plastics compared to other materials such as glass and metal. In particular, thermoplastic polymers, e.g. polyethylene terephthalate (PET), are still widely used in the packaging industry. An adhesive label bearing a design, wording, the manufacturer's and/or product trademark and possibly information regarding the packaged product is applied on most plastic packaging. The label can be made of paper or, more often, of a polymeric material, e.g. polyethylene, polypropylene, polyester, polyethylene terephthalate, polystyrene or polyvinyl chloride. The label adheres to the package by means of a pressure-sensitive adhesive (PSA) which is typically acrylic-based.

Since plastic packaging is still very widespread, there arises the problem of recycling these materials efficiently and at a low cost.

The end consumer of products normally introduces packaging made of plastic material into containers for the separate collection of plastic without removing the label. Recycling centres must therefore remove the labels, for example by washing, so as to increase the efficiency of recycling of the plastic material making up the packaging. Separating the label from the package is important because it is typically made of a different material from the packaging on which it is applied. For example, the label can be made of paper or of a polymeric material differing from the one used for the package. Even where there were a similarity between the materials of the packaging and the label, there would still be the problem of the adhesive (which is not necessarily recyclable with the plastic) and the inks and also of whether it may actually be possible to recycle the material of the label with the packaging material (e.g. a polyolefin film with a polyethylene (PE) bottle).

If the label were not removed, the material (e.g. plastic or glass) of the containers would be in a mixture with the adhesive and the material of the label, with consequent problems in terms of the efficiency of the recycling process.

It is thus important that the label be detached rapidly and completely from the packaging, which is then recycled with known processes.

In the case of paper labels, removal is easily achieved because paper, being porous, allows the penetration of the alkaline washing solution across the entire surface thereof, until arriving in contact with the adhesive and allowing the removal of the label.

If, on the other hand, the label is made of polymeric material, it will not be impregnated with alkaline solution because the polymeric material is not porous like paper and indeed it is very often impermeable to liquids. Therefore, the alkaline solution is able to penetrate only through the exposed section of adhesive that is to be found between the label and the packaging, a section which, however, represents a negligible surface area. The consequence is that the label detachment reaction takes a longer time compared to paper.

In order to facilitate detachment of the plastic label, various measures can be adopted, such as, for example, some adhesives that dissolve easily in the basic solution used to remove the labels or grinding the package with the label and subsequently removing the label from the product fragments by means of washing with a hot alkaline solution and vigorous agitation, as proposed by WO2014/039796.

From the same document it is also known that the density of the front layer of the label can be lower or higher than the density of the caustic soda solution. In this manner, the label, once removed, can float above the removal solution or sink to the bottom of the solution, respectively.

The polyester (PET) packaging recycling industry is of particular importance and is particularly developed, probably due to the large volumes used in the beverage sector and also because in many cases the material to be recycled is very clean and of very high quality (one need only think of mineral water). In this sector, therefore, commonly accepted recycling protocols have been developed which provide for grinding of the labelled packaging and treatment of the resulting fragments under agitation at 80° C. in the presence of percentages of caustic soda (e.g. 1-2%). Examples of important protocols are: in the case of Europe, QT508 of the European PET Bottle Platform (EPBP), or, in the case of the USA, the APR (American Plastic Recyclers) protocol. In both cases, in order to separate the clean packaging fragments, to be sent off for recycling, from the label fragments, one exploits the specific weight of PET, which is greater than that of water: the PET sinks to the bottom and the label fragments float.

Therefore, in the PET container recycling sector, it is important that the label consist of materials that have a density lower than 1, i.e. lower than the density of water, to enable the label to float on top of the water in the step of separating the label from the PET container.

The linerless self-adhesive material of WO2014/207693 that is used to prepare linerless self-adhesive labels commonly employed for labelling plastic items has a reduced thickness and therefore an environmentally sustainable aspect that must be preserved for marketing reasons.

However, if, in addition to being of reduced thickness, the label obtained from the linerless self-adhesive material of WO2014/207693 must also be easily recyclable, there arises the problem of how to prepare a label that is sustainable, i.e. with thicknesses maintained below 100 μm, but at the same time also easily recyclable with the known methods, i.e. by treating the labelled item with a hot basic solution.

The present invention provides a linerless self-adhesive material and an associated label capable of combining a sustainable aspect and an easy separation from the labelled item, thereby favouring the recyclability of the item itself.

SUMMARY OF THE INVENTION

The invention relates to a self-adhesive material comprising:

a self-adhesive layer comprising a polymer film having a front surface, optionally coated (or laminated) with a thermo-adhesive, and a surface, opposite the front one, coated (or laminated) with a pressure-sensitive adhesive (PSA);

and, in contact with the PSA, a support layer (or protective layer or liner or backing substrate) coated (or laminated) with a non-stick material on the surface in contact with the PSA and optionally coated with a thermo-adhesive on the other surface (i.e. on the surface opposite the one coated with the non-stick material).

In the self-adhesive material described above, at least one between the front surface of the polymer film and the surface of the support layer opposite the one coated with the non-stick material is coated with a thermo-adhesive.

The self-adhesive material is characterised in that the polymer film of the self-adhesive layer consists of a polymeric material having a density equal to or less than 0.9 $g/cm^3$, preferably comprised between 0.6 $g/cm^3$ and 0.9 $g/cm^3$, more preferably between 0.7 and 0.8 $g/cm^3$ at 25° C. Said material is preferably cavitated polypropylene (PP).

The liner is preferably made of polyethylene terephthalate (PET) or polypropylene (PP) with a density equal to or greater than 0.8 $g/cm^3$.

Through the process known from WO2014/207693 it is possible to prepare a linerless self-adhesive material starting from the self-adhesive material of the invention. The linerless self-adhesive material thus obtained is also an object of the invention.

The self-adhesive material has a total density equal to or less than 1.0 $g/cm^3$.

In particular, the linerless self-adhesive material comprises a liner, originally used to protect the PSA against possible contact, which is applied on the polymer film of the self-adhesive layer so that the thermo-adhesive is placed between the front surface of the polymer film and the surface of the liner opposite the one coated with the non-stick agent in order to achieve a permanent lamination and thus also protection of the surface, which is possibly printed, of the polymer film or liner.

The linerless self-adhesive material also has a total density equal to or less than 1.0 $g/cm^3$.

In a preferred embodiment, one between the front surface of the polymer film and the surface of the liner opposite the one coated with the non-stick agent is printed.

The linerless self-adhesive material is likewise characterised in that the polymer film comprises a polymeric material having a density equal to or less than 0.9 $g/cm^3$, preferably comprised between 0.6 $g/cm^3$ and 0.9 $g/cm^3$, more preferably between 0.7 and 0.8 $g/cm^3$ at 25° C. Said material is preferably cavitated polypropylene (PP).

In the linerless self-adhesive material as well, the liner is preferably made of polyethylene terephthalate (PET) or polypropylene (PP) with a density equal to or greater than 0.8 $g/cm^3$.

The linerless self-adhesive material has a total density equal to or less than 1.0 $g/cm^3$.

Both the starting self-adhesive material with a liner and the linerless self-adhesive material of the invention are preferably in the form of a tape, preferably wound onto a reel.

The linerless self-adhesive material of the invention comprises a plurality of strips, each comprising a plurality of self-adhesive labels. Each self-adhesive label has two opposite microperforated sides and opposite continuous sides. Along the continuous sides, the plurality of labels is divided into a plurality of strips by means of a die-cutting technique or by means of tangential cutting. Therefore, each strip comprises a plurality of labels joined together through opposite microperforated sides. The microperforation of the opposite sides of the plurality of labels allows for easy detachment of one label from the other, detachment which is performed by the labelling machine during application of the labels onto the objects to be labelled.

Therefore, an object of the invention is also a self-adhesive label that can be obtained starting from the linerless self-adhesive material of the invention according to the description provided above and characterised in that the polymer film of the self-adhesive layer comprises a polymeric material having a density equal to or less than 0.9 g/cm$^3$, preferably comprised between 0.6 g/cm$^3$ and 0.9 g/cm$^3$, more preferably between 0.7 and 0.8 g/cm$^3$ at 25° C. Said material is preferably cavitated polypropylene (PP).

The linerless label has a total density equal to or less than 1.0 g/cm$^3$.

BRIEF DESCRIPTION OF THE FIGURES

The invention is described here below in a detailed manner, also with reference to the appended figures, in which:

FIG. 1 shows a sectional view of one embodiment of the self-adhesive material with a support layer (liner);

FIG. 2 shows a sectional view of the linerless self-adhesive material of the invention obtained using the starting self-adhesive material in FIG. 1;

FIG. 3 shows a sectional view of one embodiment of the self-adhesive material with a support layer (liner);

FIG. 4 shows a sectional view of the linerless self-adhesive material of the invention obtained using the starting self-adhesive material in FIG. 3;

FIG. 5 shows a top view of a linerless self-adhesive material comprising a plurality of strips, each comprising a plurality of self-adhesive labels, after microperforation;

FIG. 6 shows a strip of linerless self-adhesive material obtained after microperforation and die-cutting or tangential cutting.

DETAILED DESCRIPTION OF THE INVENTION

The self-adhesive material used as the starting material for preparing the linerless self-adhesive material and the associated label comprises:

a self-adhesive layer comprising a polymer film having a front surface, optionally coated (or laminated) with a thermo-adhesive, and a surface, opposite the front one, coated (or laminated) with a pressure-sensitive adhesive (PSA);
and, in contact with the PSA,
a support layer (or protective layer or liner or backing substrate) comprising a film coated (or laminated) with a non-stick material on the surface in contact with the PSA and optionally coated with a thermo-adhesive on the other surface (i.e. on the surface opposite the one coated with the non-stick material).

In the self-adhesive material described above, at least one between the front surface of the polymer film of the self-adhesive layer and the surface of the support layer opposite the one coated with the non-stick material is coated with a thermo-adhesive.

The support layer is made of plastic material, preferably transparent.

The polymer film of the self-adhesive layer comprises or consists of a polymeric material having a density equal to or less than 0.9 g/cm$^3$, preferably comprised between 0.6 g/cm$^3$ and 0.9 g/cm$^3$, more preferably between 0.7 and 0.8 g/cm$^3$ at 25° C. Said material is preferably cavitated polypropylene (PP).

The self-adhesive material has a total density equal to or less than 1.0 g/cm$^3$, preferably comprised between 0.90 and 0.99 g/cm$^3$.

The film of plastic material of the liner comprises or consists of a plastic material having a density equal to or greater than 0.8 g/cm$^3$, preferably between 0.9 g/cm$^3$ and 1.5 g/cm$^3$, more preferably between 1 and 1.4 g/cm$^3$ at 25° C.

The film of plastic material of the liner preferably comprises or consists of PET or PP.

PET is a material that has a density comprised between 1.370 and 1.455 g/cm$^3$ at 25° C.; it is thus a material that is heavier than water. Polypropylene has a density comprised between 0.855 g/cm$^3$ and 0.946 g/cm$^3$ at 25° C.

The Applicant has thus addressed the problem of how to produce a self-adhesive material with a liner that may give rise to a linerless self-adhesive material and hence to a label that floats in the basic solution used in the step of recycling a labelled container, in particular when the labelled container is made of PET, considering that the polymer film of the self-adhesive material is normally made of PET or PP and the liner is normally made of PET.

For technological reasons, where one wishes to maintain PET as the material of the liner, the amount of PET and hence the thickness of the PET layer of the liner, which is the heavier polymer, cannot be reduced beyond certain limits, because otherwise there would be problems with the technical performance of the label; moreover, it would be difficult to prepare a layer of PET with greatly reduced thicknesses.

The thickness of the PET layer must therefore be maintained between 8 and 25 μm, preferably between 10 and 14 μm, more preferably between 12 and 15 μm, in order to avoid compromising the technical performance of the final label and also because it would be technologically difficult to succeed in preparing a PET film with thicknesses of less than 10 μm.

The total thickness of a label prepared from the linerless self-adhesive material of WO2014/207693 must be less than 100 μm in order to maintain a thin and sustainable aspect and avoid increasing costs by using excess material.

Therefore, despite using a PET liner layer as thin as possible, if a polypropylene with a density comprised between 0.855 g/cm$^3$ and 0.946 g/cm$^3$ at 25° C. were used to prepare the polymer film of the self-adhesive layer, a very large amount of polypropylene would have to be used in order to compensate for the high density of the PET. This would entail an increase in the total thickness of the label, beyond the limit of 100 μm, which represents the maximum value at which it is desired to arrive in order to avoid generating a label that is too thick and therefore unsustainable.

For example, supposing one were to use a 12 μm PET liner layer with a density comprised between 1.370 and 1.455 g/cm$^3$ at 25° C. to obtain a self-adhesive layer with a total density of less than 1, and hence a label that can float in the basic removal solution in the step of recycling the labelled item, a 90 μm polypropylene layer would have to be used, thus generating a self-adhesive layer with a thickness of 102 μm. However, this thickness is not wanted or desired, because the final label would be too thick. In order to obviate this drawback, the Applicant has tried using a different polypropylene material to prepare the polymer film of the self-adhesive layer, in particular a polymeric material having a density equal to or less than 0.9 g/cm³, preferably comprised between 0.6 g/cm³ and 0.9 g/cm³, more preferably between 0.7 and 0.8 g/cm³ at 25° C.

The preferred polymeric material is cavitated polypropylene, which has a density equal to or less than 0.9 g/cm³ at 25° C. The cavitated polypropylene is preferably a biaxially oriented polypropylene (BOPP) which comprises microcavities generated during production of the layer. With the aim of maintaining the presence of these microcavities, after extrusion the layer is biaxially oriented, that is, it is subjected to lengthening in the horizontal and vertical directions. The biaxial lengthening increases the microcavities which are responsible for lowering the density of the polymer.

Cavitated polypropylene has a density comprised between 0.65 and 0.88 g/cm³, preferably between 0.7 and 0.8 g/cm³ at 25° C., hence a lower density than polypropylene.

After numerous attempts and tests, reported in the experimental part of this patent application, the Applicant found the conditions to be able to prepare a self-adhesive material with a liner, a linerless self-adhesive material and a label with a total density less than that of water while succeeding in maintaining, however, a total thickness of less than 100 µm, thus guaranteeing the sustainability aspect of the label.

For example, using a 12 µm PET liner layer with a density comprised between 1.370 and 1.455 g/cm³ at 25° C., the Applicant developed a label with a density of less than 1 by using a layer of cavitated polypropylene for the polymer film having a thickness equal to 40 µm.

In one embodiment, the film of plastic material of the liner, made of a material having a density equal to or greater than 0.8 g/cm³, preferably between 0.9 g/cm³ and 1.5 g/cm³, more preferably between 1 and 1.4 g/cm³ at 25° C., has a thickness between 8 and 25 µm, preferably between 10 and 14 µm, more preferably between 12 and 18 µm. In this case, the percentage of polymeric material with a density equal to or less than 0.9 g/cm³ is comprised between 45% and 65% relative to the total of the self-adhesive material with a liner In one embodiment, the polymer film of the self-adhesive layer made of polymeric material with a density equal to or less than 0.9 g/cm³, preferably comprised between 0.6 g/cm³ and 0.9 g/cm³, more preferably between 0.7 and 0.8 g/cm³ at 25° C., has a thickness between 40 and 70 µm, preferably between 30 and 50 µm. In this case, the percentage of material having a density equal to or greater than 0.8 g/cm³ is comprised between 20 and 30%, the remaining part being adhesive.

In one embodiment, the self-adhesive material comprises a polymer film of cavitated PP with a thickness between 40 and 70 µm, preferably between 30 and 50 µm; and a PET or PP liner with a thickness between 8 and 25 µm, preferably between 10 and 14 µm, more preferably between 12 and 18 µm. In one embodiment, the self-adhesive material with a liner comprises a self-adhesive layer comprising a polymer film and a layer of PSA and a layer of thermo-adhesive applied on the front surface of the polymer film, wherein the entire self-adhesive material with a liner has a thickness between 50 and 100 µm, preferably between 60 and 95 µm, more preferably between 60 and 85 µm.

In one embodiment, the self-adhesive material with a liner comprises a self-adhesive layer comprising a polymer film, a layer of PSA, a liner and a layer of thermo-adhesive applied on the surface of the liner opposite the one coated with the non-stick material, wherein the entire self-adhesive material with a liner has a thickness between 50 and 100 µm, preferably between 60 and 95 µm, more preferably between 60 and 85 µm Preferably, the pressure-sensitive adhesive (PSA) is a (solvent-based, water-based or UV curable) acrylic adhesive or a solvent-based or hot melt natural and/or synthetic rubber adhesive.

In one embodiment, the PSA comprises acrylic polymers having "wash-off" properties such as to produce a detachment of a polypropylene label from a bottle made of virgin PET according to the EPBP QT508 protocol.

The PSA can be applied on the surface opposite the front surface of the polymer film of the self-adhesive layer as a uniform, continuous layer, or else it can be applied in portions. The discrete portions of adhesive are applicate on the surface opposite the front surface of the polymer film, i.e. they are distributed on the back surface at a minimum distance between them that is equal to or greater than 0.5 mm. Preferably, the minimum distance between the discrete portions of adhesive is comprised between 0.75 mm and 5 mm, preferably between 0.75 mm and 3 mm, preferably between 0.75 mm and 2 mm, preferably between 0.75 and 1.5 mm, preferably between 0.8 and 1.2 mm. In other words, the discrete portions of adhesive present on the back surface of the polymer film are positioned at a minimum reciprocal distance that is equal to or greater than 0.5 mm. The discrete portions of adhesive are preferably positioned at a minimum reciprocal distance comprised between 0.75 mm and 5 mm, preferably between 0.75 mm and 3 mm, preferably between 0.75 mm and 2 mm, preferably between 0.75 and 1.5 mm, preferably between 0.8 and 1.2 mm.

The discrete portions of adhesive are positioned on the back surface by means of a two-dimensional distribution on the plane of the back surface.

The discrete portions of adhesive are positioned on the back surface so as to maintain the minimum distance indicated and create, by virtue of their arrangement, a plurality of interwoven bands or portions that are empty, i.e. free of adhesive. The adhesive-free bands are portions of polymer film, in particular of the back surface of the polymer film, where no adhesive is present and they enter into direct contact with the item. The adhesion of the label to the item is assured by the discrete portions of adhesive present on the surface.

"Minimum distance" means the distance between the two closest points of at least two discrete portions of adhesive.

The discrete portions of adhesive can have a variety of forms or shapes. By way of example, they can have a circular shape, oval shape, rhomboidal shape, square shape, rectangular shape, trapezoidal shape, parallelepiped shape or a combination of these shapes. Other possible forms or shapes are a star shape, drop shape, half moon shape, the form of words, the form of a design, or a combination of these forms or shapes.

The application of the adhesive in portions as described above has an advantage in that, during recycling of the labelled item, the label can be removed in decidedly less time than in the case where the adhesive is applied as a continuous layer. This is because the basic label washing and removal solution is able to penetrate between the item and the label precisely owing to the adhesive-free portions present on the back surface of the polymer film.

A thermo-adhesive can be applied on the front surface of the polymer film, opposite the one coated with the PSA.

The non-stick material used to coat one of the two surfaces of the liner is preferably a silicone resin (water-based, solvent-based, or "solventless", crosslinked with heat or by means of UV).

A thermo-adhesive can be applied on the opposite surface of the liner (opposite the one coated with the non-stick material).

The thermo-adhesive applied on the polymer film or liner is preferably selected from among a polyamide lacquer, a polyurethane lacquer and an acrylic lacquer.

In a preferred embodiment, the self-adhesive material of the invention comprises an additional layer, which is applied over the front surface of the self-adhesive layer, or over the surface of the liner opposite the surface coated with the non-stick material, said additional layer comprising a printing adhesion promoter, e.g. an acrylic or polyurethane emulsion.

In addition to being chemically treated with the emulsion just described, the front surface of the polymer film, or the surface of the liner opposite the one coated with the non-stick agent, can preferably also be treated physically by means of a corona or flame treatment (known in the art) preferably carried out prior to the chemical treatment, or it can be treated with a chemical treatment alone or a physical treatment alone. The physical treatment is aimed at increasing the surface tension of the front surface with the intention of promoting subsequent adhesion of the printing inks.

At least one between the front surface of the polymer film and the surface of the liner opposite the one coated with the non-stick material is physically and/or chemically treated, whereas the thermo-adhesive is applied to the other surface.

In a preferred embodiment, the self-adhesive material of the invention also comprises a printing layer, in turn comprising one or more layers of colour/ink depending on the wording, logo, design or trademark one wishes to affix. The printing layer can be total or partial.

In one embodiment, the printing layer is applied onto the front surface (chemically and/or physically treated as described above or untreated). In this case, the thermo-adhesive is applied on the liner surface opposite the one coated with the non-stick agent.

In an alternative embodiment, this printing layer is applied on the liner, in particular on the surface of the liner opposite the one coated with the non-stick agent (chemically and/or physically treated as described above or untreated). In this case, the thermo-adhesive is applied on the front surface of the polymer film.

The self-adhesive material of the invention is preferably in the form of a continuous tape, preferably wound onto a reel.

FIG. 1 appended hereto describes a particularly preferred embodiment of the self-adhesive material used as the starting material for preparing the linerless self-adhesive material. FIG. 1 shows a sectional view of the material, which is preferably in the form of a continuous tape wound onto a reel.

In FIG. 1, the self-adhesive starting material to be loaded on the machine for carrying out production of the linerless self-adhesive material is indicated in its entirety by the number 1; the machine is described in detail in WO2014/207693. The number 2 indicates the self-adhesive material in its entirety, whilst the number 3 indicates the liner in its entirety.

The self-adhesive material comprises a polymer film made of a polymeric material having a density equal to or less than 0.9 g/cm³, preferably comprised between 0.6 g/cm³ and 0.9 g/cm³, more preferably between 0.7 and 0.8 g/cm³ at 25° C., preferably made of cavitated PP, having a front surface treated with a chemical and/or physical treatment 2c (i.e. with the application of an acrylic and/or polyurethane emulsion and/or with a corona or flame treatment), capable of promoting adhesion of the printing, a printing layer 2d applied on the treated front surface, and a pressure-sensitive adhesive (PSA) 2b, for example acrylic-based, applied on the surface opposite the front surface.

As stated above, the printing and the surface chemical and/or physical treatment may also not be present.

The liner 3 comprises a film made of polymeric material having a density equal to or greater than 0.8 g/cm³, preferably between 0.9 g/cm³ and 1.5 g/cm³, more preferably between 1 and 1.4 g/cm³ at 25° C., preferably made of transparent PET or PP, 3a, coated with a layer of silicone 3b on one surface and on the opposite surface with a thermo-adhesive 3c, selected from among a polyamide, polyurethane or acrylic lacquer.

FIG. 3 shows an alternative embodiment of the self-adhesive material of the invention. FIG. 3 shows a sectional view of the material, which is preferably in the form of a continuous tape wound onto a reel.

In FIG. 3, the self-adhesive starting material to be loaded on the machine for carrying out the process of production of the linerless self-adhesive material is indicated by the number 5. The number 6 indicates the self-adhesive layer in its entirety, whilst the number 7 indicates the liner in its entirety.

The self-adhesive layer comprises a film made of a polymeric material 6a having a density equal to or less than 0.9 g/cm³ at 25° C., preferably comprised between 0.6 g/cm³ and 0.9 g/cm³, more preferably between 0.7 and 0.8 g/cm³ at 25° C., preferably made of cavitated PP, and having a front surface coated with a thermo-adhesive 6b, selected from among a polyamide lacquer, a polyurethane lacquer or an acrylic lacquer; and a pressure-sensitive adhesive (PSA) 6c, for example acrylic-based, applied on the surface opposite the front one. In this particular embodiment, the layer of adhesive 6c is a continuous layer. However, it is also possible to have an embodiment wherein the adhesive 6c is applied in portions.

The liner 7 comprises a film made of polymeric material 7a having a density equal to or greater than 0.8 g/cm³, preferably between 0.9 g/cm³ and 1.5 g/cm³, more preferably between 1 and 1.4 g/cm³ at 25° C., preferably made of transparent PET or PP, and coated with a layer of silicone 7b on one surface; the opposite surface is treated with a chemical and/or physical treatment 7c (i.e. with the application of an acrylic and/or polyurethane emulsion and/or with a corona or flame treatment) capable of promoting the adhesion of the printing; a printing layer 7d is applied on the treated surface of the liner.

As stated above, the printing and the surface chemical and/or physical treatment may also not be present.

Conventional techniques are used for production of the self-adhesive material, for example, coating and lamination or other techniques normally applied in the sector of production of self-adhesive materials.

In particular, an adhesion promoter for the printing ink can be applied on the front surface of the polymer film of the self-adhesive layer (chemical treatment), after prior physical treatment of the surface (corona or flame treatment) to increase the surface tension of the plastic or paper. Alternatively, a thermo-adhesive can be applied on the front surface, for example by means of coating or lamination; the adhesive (PSA) is then applied on the opposite surface, for example by coating.

The liner is produced by applying a non-stick material (e.g. silicone) on one surface and the thermo-adhesive on the other surface, for example by coating. The non-stick material and the thermo-adhesive can be solvent-based or water-based and, as such, they are applied, for example by coating, on the opposite surfaces of the liner.

Alternatively, rather than applying the thermo-adhesive, a physical and/or chemical treatment can be carried out on the liner surface opposite the one coated with the non-stick material, i.e. an acrylic and/or polyurethane emulsion can be applied by lamination or coating, and/or a corona or flame treatment can be performed.

Finally, one proceeds with lamination of the liner, which has been treated on both surfaces, and with lamination of the self-adhesive layer, with the adhesive in the middle, thereby obtaining a single product that is rewound onto the reel (semi-finished).

Preferably, the reel thus obtained can be subsequently cut on other machines so as to transform it into narrower and shorter rolls, according to customer requirements.

The self-adhesive material with the liner, printed or not printed (according to the needs of the end customer), preferably wound onto a reel, is used as a self-adhesive starting material to produce the linerless self-adhesive material by means of the process known from WO2014/207693.

FIG. 2 shows an embodiment of the final construction of the linerless self-adhesive material produced with the process of WO2014/207693 starting from the initial self-adhesive material in FIG. 1.

The linerless self-adhesive material of the invention in its entirety is indicated by the number 4, whilst the liner in its entirety is indicated by the number 3 and the self-adhesive layer in its entirety is indicated by the number 2.

In FIG. 2 it can be noted that the linerless self-adhesive material has an "inverted" construction compared to the self-adhesive material with the starting liner. From its original position in contact with the PSA 2b, the layer of non-stick material 3b, in the final construction, is facing outwards. The same thing can also be noted in the case of the PSA layer 2b, which instead of being in contact with the non-stick material 3b, as in the final construction, is facing outwards in an opposite direction to the non-stick material 3b.

The polymer film made of a polymeric material 2a having a density equal to or less than 0.9 g/cm$^3$ at 25° C., preferably comprised between 0.6 g/cm$^3$ and 0.9 g/cm$^3$, more preferably between 0.7 and 0.8 g/cm$^3$ at 25° C., preferably made of cavitated PP, of the self-adhesive layer, which has been treated with a physical and/or chemical treatment 2c, and printed 2d, is in direct and permanent contact with the thermo-adhesive 3c of the film made of polymeric material having a density equal to or greater than 0.8 g/cm$^3$, preferably between 0.9 g/cm$^3$ and 1.5 g/cm$^3$, more preferably between 1 and 1.4 g/cm$^3$ at 25° C., preferably made of transparent PET or PP, of the liner.

The layer made of non-stick material 3b and the PSA layer 2b are then placed in contact in the last step of the process in which the linerless self-adhesive material is preferably rewound onto a reel.

FIG. 4 shows another embodiment of the final construction of the linerless self-adhesive material produced with the process of WO2014/207693 starting from the initial self-adhesive material in FIG. 3.

The linerless self-adhesive material of the invention in its entirety is indicated by the number 8, whereas the liner in its entirety is indicated by the number 7 and the self-adhesive layer in its entirety is indicated by the number 6.

The peculiar "inverted" construction of the final material can be noted from FIG. 4. From its original position in contact with the PSA 6c, the layer of non-stick material 7b is now in the final construction, facing outwards. The same thing can also be noted in the case of the layer of PSA 6c, which, instead of being in contact with the non-stick material 7b, as in the initial construction, is facing outwards in the opposite direction to the non-stick material 7b.

The plastic film made of a polymeric material 6a of the self-adhesive layer, having a density equal to or less than 0.9 g/cm$^3$ at 25° C., preferably made of cavitated polypropylene, and coated with the thermo-adhesive 6b, is in direct and permanent contact with the film made of a polymeric material 7a of the liner, having a density equal to or greater than 0.8 g/cm$^3$, preferably made of PET or PP, and has been treated with a physical and/or chemical treatment 7c, and printed 7d.

The layer of non-stick material 7b and the PSA layer 6c are then placed in contact in the last step of the process, in which said linerless self-adhesive material is preferably rewound onto a reel.

The linerless self-adhesive material produced at the end of the process has a total density of less than 1 g/cm$^3$, preferably comprised between 0.90 and 0.99 g/cm$^3$.

The linerless self-adhesive material produced at the end of the process is preferably in the form of a self-adhesive linerless tape comprising a plurality of self-adhesive strips, each comprising a plurality of self-adhesive labels.

In a preferred embodiment, prior to being rewound onto a reel, the linerless self-adhesive material undergoes a microperforation and/or die cutting step.

The microperforated self-adhesive material appears, for example, as shown in FIG. 5.

The number 4 indicates the linerless self-adhesive material obtained at the end of the process (for example the one represented in a sectional view in FIG. 2, but it could also be the linerless self-adhesive material 8 in FIG. 4). The view is a front view.

The linerless self-adhesive material 4 comprises a plurality of strips, each indicated overall by the number 9. Each strip comprises a plurality of linerless self-adhesive labels 10.

Each label has two opposite microperforated sides 10a and two continuous opposite sides 10b that represent the dividing line between one strip and another. The number 11 instead indicates the skeleton of the labels (which can also be present between the strips). Simultaneously with the microperforation (or in a preceding or subsequent step), the linerless self-adhesive material undergoes a division into strips, preferably by die cutting or tangential cutting along the opposite continuous sides 10b of the self-adhesive labels.

An example of a microperforated and die-cut linerless self-adhesive strip is indicated in FIG. 6 by the number 9. The strip 9 is obtained for example by die-cutting the plurality of self-adhesive strips represented in FIG. 5. The strip in FIG. 6 comprises a plurality of labels 10 comprising two opposite microperforated sides 10a and two opposite continuous sides 10b.

The linerless self-adhesive material, in the form of strips, is applied on the objects to be labelled with specific labelling machines capable of detaching the individual labels that make up the material.

An object of the invention is also a linerless self-adhesive material in the form of a tape comprising a plurality of self-adhesive strips, each comprising a plurality of self-adhesive labels, as represented in FIG. 5 for example.

An object of the invention is also a strip of linerless self-adhesive material obtained after microperforation and die cutting or tangential cutting of a tape of linerless self-adhesive material, as shown in FIG. 6 for example.

These products all comprise a polymer film made of a polymeric material having a density equal to or less than 0.9 g/cm$^3$ at 25° C., preferably made of cavitated polypropylene, and a liner made of plastic material having a density equal to or greater than 0.8 g/cm$^3$, preferably made of PET or PP, according to the invention.

An object of the invention is also a self-adhesive linerless label obtainable from a self-adhesive strip by separation along the microperforated sides, which is normally carried out by a labelling machine.

Said label comprises a polymer film made of a polymeric material having a density equal to or less than 0.9 g/cm$^3$ at 25° C., preferably comprised between 0.6 g/cm$^3$ and 0.9 g/cm$^3$, more preferably between 0.7 and 0.8 g/cm$^3$ at 25° C., preferably made of cavitated PP, and a liner comprising a film made of a polymeric material having a density equal to or greater than 0.8 g/cm$^3$, preferably between 0.9 g/cm$^3$ and 1.5 g/cm$^3$, more preferably between 1 and 1.4 g/cm$^3$ at 25° C., preferably made of PET or PP. The label has a total density equal to or less than 1 and can thus be easily removable from a labelled item in the item recycling stage.

In one embodiment, the self-adhesive material with the liner and the linerless self-adhesive material comprise a layer of PSA, which is applied in portions as described above. In this manner, the label's removal from the item is facilitated. The label's removal from the item takes place by subjecting the item to washing with a basic solution or water for a time equal to or less than 2 hours.

The item on which the label can be applied is packaging, a box, a bottle, a container or a wrapper and is made of polymeric material, glass, metal or metal alloys. Preferably, the item is packaging, for example a bottle for liquid foods, such as water, juices, beverages etc., or it is a container for products intended for personal or household care, such as, for example, bottles for detergents, tubes for creams, shampoo, conditioner etc.

The item to be recycled is an item made of a polymeric material or made of glass or metal.

The polymeric material of the item can be, for example, polyethylene terephthalate (PET), recycled polyethylene terephthalate (rPET), high density polyethylene (HDPE), polyvinyl chloride (PVC), low density polyethylene (LDPE), polypropylene (PP), polystyrene (PS), polylactic acid (PLA), biopolymers, cellulose, polyester, recycled polyester or mixtures thereof.

The item to be recycled is made of PET.

The metal can be aluminium for example.

In order to recycle the labelled item, the item itself is subjected to washing in water or in a basic solution; the water is water with ions or deionised water.

The basic solution is preferably an aqueous solution of NaOH, KOH, LiOH, MgOH, CaOH or mixtures thereof.

The concentration of the basic solution is comprised between 1 and 5% by weight of the base. For example, the basic solution is an NaOH solution with a concentration comprised between 1 and 5% by weight, preferably 2% by weight. The basic solution or the water is applied to the item bearing the label for a time equal to or less than 2 hours, preferably equal to or less than 1 hour, more preferably between 1 minute and 1 hour. In one embodiment, the water or the basic solution is applied to the item for a time comprised between 1 minute and 30 minutes, preferably between 1 minute and 20 minutes, more preferably between 1 minute and 10 minutes. In a preferred embodiment, the water or the basic solution is applied for a time equal to 1-8 minutes, preferably 1-5 minutes, more preferably 1-4 minutes.

The labelled item undergoes washing with water or with a basic solution by immersion of the item in the solution or in the water. The water or the basic solution is applied to the item at a temperature comprised between 20° C. and 100° C., preferably between 25 and 90° C., preferably between 35 and 50° C. or between 70 and 100° C., preferably between 70 and 80° C.

In one embodiment, the basic solution is an aqueous solution of NaOH at a concentration of between 1 and 5% by weight applied to the labelled item for a time equal to or less than 5 minutes, preferably equal to or less than 4 minutes, at a temperature of between 70 and 100° C., preferably between 70 and 90° C. In one embodiment, the water is applied to the labelled item for a time equal to or less than 1 hour, preferably equal to or less than 10 minutes, more preferably comprised between 1 and 4 minutes, even more preferably between 2 and 4 minutes, at a temperature of between 70 and 100° C., preferably between 70 and 90° C.

In one embodiment of the invention, the item to be recycled is ground prior to washing with a basic solution.

By virtue of the fact that the label deriving from the linerless self-adhesive material of the invention has a total density of less than 1 g/cm$^3$, preferably comprised between 0.90 and 0.99 g/cm$^3$, in the case of packaging made of PET or materials with a density greater than 1.0 g/cm$^3$, the label, once detached from the item, will float in the basic removal solution, whereas the packaging material of the item to be recycled will sink to the bottom of the solution. In this manner, the separation of the two components is facilitated and the recyclability of the item is enhanced.

EXAMPLES

Numerous tests were conducted in order to obtain a composition of the label of the invention that simultaneously had a sustainable aspect (thus a total thickness of less than 100 µm) and a density of less than 1, so as to be able to float on top of the basic solution used to wash the PET item to be recycled.

The results of the tests are shown in table 1

TABLE 1

| Cavitated PP (µm) | PET (µm) | DENSITY of the label | % PET | % Cavitated PP | % adhesive |
|---|---|---|---|---|---|
| 20 | 12 | 1.06 | 35.1 | 31.4 | 33.5 |
| 30 | 12 | 1.02 | 30.4 | 40.7 | 28.9 |
| 40 | 12 | 0.99 | 26.8 | 47.8 | 25.5 |
| 50 | 12 | 0.96 | 23.9 | 53.3 | 22.8 |
| 60 | 12 | 0.94 | 21.6 | 57.8 | 20.6 |
| 70 | 12 | 0.92 | 19.7 | 61.5 | 18.8 |
| 80 | 12 | 0.91 | 18.1 | 64.7 | 17.2 |
| 90 | 12 | 0.90 | 16.7 | 67.3 | 16.0 |
| 100 | 12 | 0.89 | 15.6 | 69.6 | 14.8 |

Cavitated PP density = 0.75 g/ml
PET density = 1.40 g/ml

As may be seen from the results shown in table 1, only with cavitated PP thicknesses comprised between 40 and 80 µm, maintaining the thickness of the PET liner (12 µm) to the minimum possible, is it possible to obtain a label that simultaneously has a sustainable aspect, hence a thickness of less than 100 µm and a density of less than 1.

A self-adhesive label consisting of a PET liner with a thickness of 12 microns and a 40 micron cavitated PP film laminated together, with a thermo-adhesive applied onto the back of the liner and with 16 g of the PSA called AR842 was subjected to a wash-off test, according to the EPBP QT508 protocol, by the authoritative independent institute Cyclos HTP GmbH of Aachen. Under the test conditions, the self-adhesive material demonstrated to come cleanly detached from the PET packaging and the fragments thereof demonstrated to float in the wash-off solution. The label of the invention thus proved its compatibility with the PET packaging recycling process.

The invention claimed is:

1. A self-adhesive material comprising:
   a) a self-adhesive layer comprising a polymer film having a front surface and a surface, opposite the front surface, coated with a pressure-sensitive adhesive, PSA; and, in contact with the PSA; and
   b) a support liner comprising a film made of plastic material coated with a non-stick material on a surface in contact with the PSA, and having a surface opposite the surface coated with the non-stick material;
   wherein at least one between said front surface of the polymer film of the self-adhesive layer and said surface opposite the surface coated with the non stick material of the film made of plastic material of the support liner is coated with a thermo-adhesive;
   wherein the polymer film comprises a polymeric material having a density equal to or less than 0.9 g/cm$^3$ at 25° C., and the self-adhesive material has a total density of less than 1 g/cm$^3$.

2. The self-adhesive material according to claim 1, wherein said polymer film comprises cavitated polypropylene.

3. The self-adhesive material according to claim 1, wherein said film made of plastic material of the support liner comprises a material having a density equal to or greater than 0.8 g/cm$^3$ at 25° C.

4. The self-adhesive material according to claim 1, wherein the film made of plastic material of the support liner comprises polyethylene terephthalate (PET) or polypropylene (PP).

5. The self-adhesive material according to claim 1, wherein the film made of plastic material of the support liner has a thickness between 8 and 25 µm.

6. The self-adhesive material according to claim 1, wherein the polymer film of the self-adhesive layer has a thickness between 40 and 70 µm.

7. The self-adhesive material according to claim 1, wherein the self-adhesive material comprises a polymer film made of cavitated polypropylene (PP) with a thickness between 40 and 70 µm, and a liner made of polyethylene terephthalate (PET) or polypropylene (PP) with a thickness between 8 and 25 µm.

8. The self-adhesive material according to claim 1, having a total thickness between 50 and 100 µm.

9. A linerless self-adhesive material comprising:
   a) a liner comprising a film made of plastic material, comprising an outward facing surface coated with a non-stick material and a surface opposite the outward facing surface;
   b) a self-adhesive layer comprising a polymer film having a front surface and a surface, opposite the front surface and facing outward, coated with a pressure-sensitive adhesive, PSA;
   wherein said front surface of the polymer film of the self-adhesive layer and said surface opposite the surface coated with the non-stick material of the film made of plastic material of the liner, are in permanent contact by means of a thermo-adhesive;
   wherein said polymer film comprises a polymeric material with a density equal to or less than 0.9 g/cm$^3$ at 25° C., and the linerless self-adhesive material has a total density of less than 1 g/cm$^3$.

10. The linerless self-adhesive material according to claim 9, wherein said polymer film comprises cavitated polypropylene.

11. The linerless self-adhesive material according to claim 9, wherein said film made of plastic material of the liner comprises a material having a density equal to or greater than 0.8 g/cm$^3$ at 25° C.

12. The linerless self-adhesive material according to claim 9, wherein the film made of plastic material of the support liner comprises polyethylene terephthalate (PET) or polypropylene (PP).

13. The linerless self-adhesive material according to claim 9, wherein the film made of plastic material has a thickness between 8 and 25 µm, whereas the polymer film of the self-adhesive layer has a thickness between 40 and 70 µm.

14. The linerless self-adhesive material according to claim 9, wherein the self-adhesive material comprises a polymer film made of cavitated polypropylene (PP) with a thickness between 40 and 70 µm, and a liner made of polyethylene terephthalate (PET) or polypropylene (PP) with a thickness between 8 and 25 µm.

15. The linerless self-adhesive material according to claim 9, having a total thickness between 50 and 100 µm.

16. A linerless self-adhesive label obtainable from the linerless self-adhesive material according to claim 9, having a total density of less than 1 g/cm$^3$.

* * * * *